April 10, 1945. T. S. DONNELLY, JR 2,373,232
ELECTRODE HOLDER
Filed Feb. 19, 1943
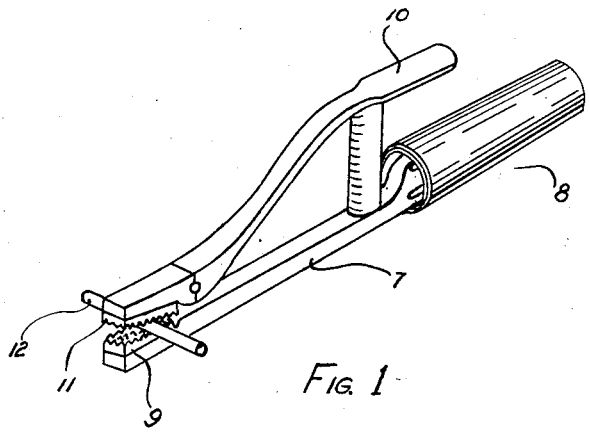
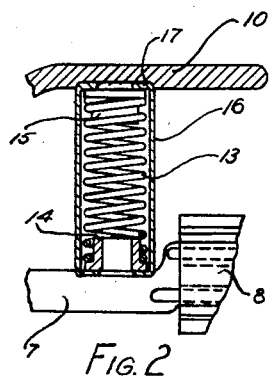
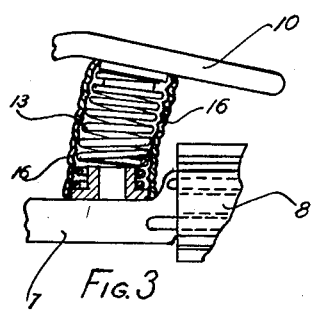
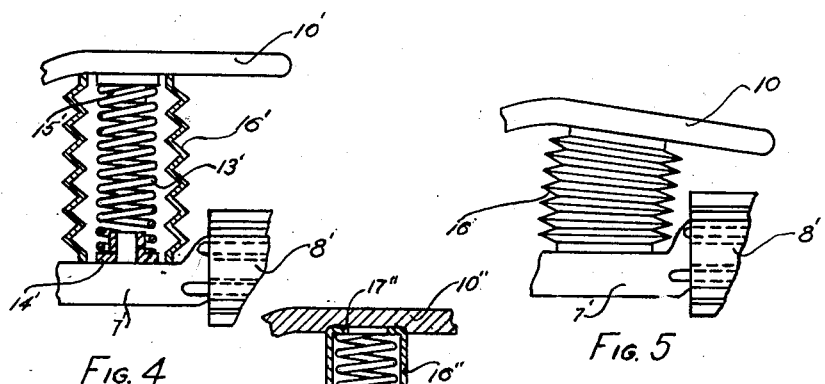
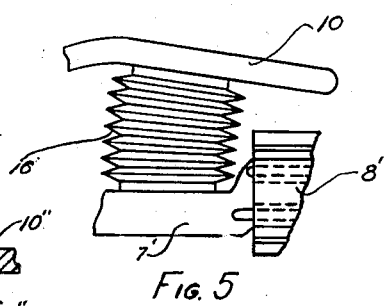
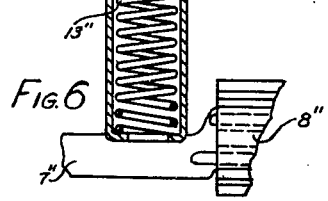
INVENTOR.
THOMAS S. DONNELLY JR
BY
HIS ATTORNEY Patented Apr. 10, 1945

2,373,232

UNITED STATES PATENT OFFICE 2,373,232

ELECTRODE HOLDER

Thomas S. Donnelly, Jr., Detroit, Mich., assignor to Bordon Mfg. Co., Inc., Detroit, Mich., a corporation of Michigan Application February 19, 1943, Serial No. 476,480

1 Claim. (Cl. 219—8)

My invention relates to a new and useful improvement in an electrode holder adapted for use in arc welding operations. It is the object of the present invention to provide in an electrode holder, having a spring for normally retaining the gripping jaws in closed position, a flexible and clothing or sheathing element for enclosing and protecting the spring while at the same time permitting the normal function and operation of the spring.

It is a further object of the invention to provide in an electrode holder of this class, having a spring for normally forcing the jaws toward each other, a flexible member for enclosing the spring and formed from heat and electrical insulating material.

It is a further object of the invention to provide in an electrode holder of this class, having a spring for normally moving the jaws toward each other, a collapsible member formed from heat and electrical insulating material for enclosing the spring and shielding the same while at the same time permitting the normal function and operation of the spring.

Other objectives will appear hereinafter.

It is recognized that various modifications and changes may be made from the detail of structure illustrated without departing from the invention, and it is intended that such variations and modifications shall be encompassed within the scope of the claim which forms a part hereof.

Forming a part of the specification is a drawing in which,

Fig. 1 is a view of an electrode holder embodying the invention.

Fig. 2 is a fragmentary side elevational view of an electrode holder showing the invention applied, the invention being shown in section.

Fig. 3 is a view similar to Fig. 2 showing the holder in a different position of operation.

Fig. 4 is a view similar to Fig. 2 showing a slightly modified form.

Fig. 5 is a view similar to Fig. 3 of the modification shown in Fig. 4.

Fig. 6 is a view similar to Fig. 2 showing the washers 14 and 15 eliminated.

In the drawing I have illustrated the invention applied to an electrode holder embodying an elongated arm 7, having a hand-grip or handle 8 mounted on one end, and provided at its opposite end with a jaw 9. Pivotally mounted on the member 7 is a lever 10, having a clamping body 11 overlying the jaw 9 and adapted to clamp an electrode 12 thereagainst. In the drawing I have illustrated a coil spring 13, positioned between the members 10 and 7 and normally urging the same apart at their rear end so as to tend to move the jaws 9 and 11 toward each other.

Mounted on the inner face of the member 7 is a collar 14, embracing which is one end of the coil spring 13. A similar collar 15 is mounted on the inner face of the member 10 and embracing this collar 15 is the opposite end of the coil spring 13.

Enclosing the coil spring 13 is a housing or tube 16 having the ends 17 inturned and engaged between the collars 14 and 15 and the members 7 and 10. This enclosing sheath 16 is formed from flexible material so that when it is desired to move the member 10 toward the member 8, as shown in Fig. 3, the sheathing 16 will not interfere with the normal functioning of the spring 13. This member 16 is formed from suitable heat and electrical insulating material such as asbestos, leather or composition material possessing the desired characteristics. In addition to serving this function, the sheath 16 also serves to prevent to a certain extent the undue displacement of the spring from its normal position of operation. It will be noted that the inside diameter of the member 16 is sufficiently large to afford clearance for the spring 13 so that there is no interference with the spring when it is compressed as shown in Fig. 3.

In Figs. 4 and 5 I have shown a slightly modified form of construction in which the plain sleeve or sheathing is substituted with a bellows construction. The bellows' sheathing 16' serves the function already mentioned relative to the member 16. In this form also it will be noted that there is sufficient clearance between the inside surface of the member 16' and the coil spring 13' to prevent any interference with the normal functioning and operation of the coil spring 13' when the member 10' is pressed downwardly toward the handle 8' as shown in Fig. 5.

The collars 14 and 15 are made from electrical insulating material so that the spring 13 is insulated electrically from the members 7 and 10. These collars also serve as heat insulators. In Fig. 6, I have illustrated the structure shown in Fig. 2 with the collars 14 and 15 eliminated, the ends of the spring 13 engaging the inturned ends 17" of the sleeve 16". These inturned ends will serve to insulate the coil spring from the members 7" and 10".

What I claim as new is:

In an electrode holder of the class described, having a pair of relatively movable gripping jaws and a spring for normally urging said jaws into gripping relation, a collar engaging each end of said spring; and a flexible sleeve embracing said spring in spaced relation thereto and having the ends thereof turned inwardly to underlie said collars.

THOMAS S. DONNELLY, Jr.